United States Patent
Woods

(10) Patent No.: US 12,548,696 B2
(45) Date of Patent: Feb. 10, 2026

(54) WIRE-EMBEDDED ZEOLITE STRUCTURES WITH BARE WIRE LEADS

(71) Applicant: Mainstream Engineering Corporation, Rockledge, FL (US)

(72) Inventor: Benjamin S. Woods, Melbourne, FL (US)

(73) Assignee: Mainstream Engineering Corporation, Rockledge, FL (US)

( * ) Notice: Subject to any disclaimer, the term of this patent is extended or adjusted under 35 U.S.C. 154(b) by 447 days.

(21) Appl. No.: 18/177,836

(22) Filed: Mar. 3, 2023

(65) Prior Publication Data

US 2024/0296977 A1 Sep. 5, 2024

(51) Int. Cl.

| | |
|---|---|
| *H01B 13/14* | (2006.01) |
| *B01J 20/18* | (2006.01) |
| *B01J 29/00* | (2006.01) |
| *B01J 35/50* | (2024.01) |
| *B29C 48/154* | (2019.01) |
| *B29C 48/155* | (2019.01) |
| *B29C 70/72* | (2006.01) |
| *B33Y 10/00* | (2015.01) |
| *B33Y 70/10* | (2020.01) |
| *B33Y 80/00* | (2015.01) |
| *H01B 3/08* | (2006.01) |

(52) U.S. Cl.
CPC .............. *H01B 13/14* (2013.01); *B33Y 10/00* (2014.12); *B33Y 70/10* (2020.01); *B33Y 80/00* (2014.12); *H01B 3/08* (2013.01); *B01J 20/18* (2013.01); *B01J 29/00* (2013.01); *B01J 35/50* (2024.01); *B01J 2220/40* (2013.01); *B01J 2229/00* (2013.01); *B29C 48/154* (2019.02); *B29C 48/155* (2019.02); *B29C 70/72* (2013.01)

(58) Field of Classification Search
CPC ..... B29C 48/154; B29C 48/155; B29C 70/72; H01B 13/14; B33Y 70/10; B01J 20/18; B01J 29/00; B01J 35/50; B01J 2220/40; B01J 2229/00
See application file for complete search history.

(56) References Cited

U.S. PATENT DOCUMENTS

| | | | |
|---|---|---|---|
| 4,246,228 A * | 1/1981 | Jones ..................... | G01N 27/16 436/151 |
| 12,327,657 B1 * | 6/2025 | Woods ................... | H01B 13/14 |

* cited by examiner

*Primary Examiner* — Christina A Johnson
(74) *Attorney, Agent, or Firm* — Michael W. O'Neill, Esq.

(57) ABSTRACT

A structure fabricated of a zeolite-based paste with an intra-layer continuous wire embedded is disclosed. Vitally, the continuous wire is extended past the bounds of the structure's walls, creating bare wire leads that allow for connection to a power source for electrification. The structure is made of multiple layers stacked together, typically in an additive manufacturing (3D printing) process. Within this structure, at least one layer has an embedded wire running through at least some portion of it, and is equipped with two bare wire leads protruding from the structure. This wire is designed to act as a heating element for uniform Joule heating of the zeolite structure for reduced power consumption and temperature ramp-up time during a desorption process, as well as reduced system footprint and enhanced mechanical properties. The frequency of wire embedment (a wire embedded in every $n^{th}$ layer), the percentage of the embedded layer that contains the wire, and the wire gauge and material/composition can be modified for the desired application.

12 Claims, 8 Drawing Sheets

WIRE-EMBEDDED ZEOLITE STRUCTURES WITH BARE WIRE LEADS

STATEMENT REGARDING FEDERALLY SPONSORED RESEARCH OR DEVELOPMENT

This invention was made with government support under 80NSSC22PB082 awarded by National Aeronautics and Space Administration. The government has certain rights in the invention.

CROSS-REFERENCE TO RELATED APPLICATIONS

This application is related to currently pending U.S. patent application Ser. No. 18/177,848, filed Mar. 3, 2023 titled PROCESS FOR FABRICATING WIRE-EMBEDDED ZEOLITE STRUCTURES WITH BARE WIRE LEADS, now pending, and U.S. patent application Ser. No. 18/177,819, filed Mar. 3, 2023, titled APPARATUS FOR THE FABRICATION OF WIRE-EMBEDDED ADSORBENT STRUCTURES WITH BARE WIRE LEADS, now U.S. Pat. No. 12,327,657, the disclosures of which are hereby incorporated by reference in this application.

BACKGROUND

The present disclosure is directed to enabling the uniform heating of a zeolite structure. Notably, the present disclosure concerns using a wire embedded in a zeolite structure during an additive manufacturing (3D printing) process for Joule heating of the structure. To connect this embedded wire to the power source for electrification, a bare wire section is present before and after embedded sections of wire.

Zeolites are a class of microporous materials that are commonly used in adsorbent applications. Depending on the specific (e.g., 13X, 4A) zeolite used, they may be suited for the adsorption of $CO_2$, $H_2O$, $SO_2$, or other compounds. Typically, zeolites are contained in a structure or bed with a fluid running through it containing the compound desired to be adsorbed. Once the zeolite's pores are saturated, they can be heated to release the adsorbed compounds to a purge fluid running through the zeolite structure or bed in a process called desorption.

In certain applications, it is critical to minimize the size of the zeolite system as a whole, and reduce the power consumption during the desorption process. Traditionally, desorption is driven by heating blankets wrapped around the zeolite structure or bed, or by heating elements incrementally placed in the structure/bed after manufacturing. By embedding the heat source directly into the structure, we can minimize the size of the system and reduce power consumption and decrease temperature ramp-up time by ensuring a more uniform heating of the structure. However, in order to electrify the embedded wire to enable Joule heating, there must be a connection point present to connect the wire to a power source.

Furthermore, zeolites are ceramic materials that tend to be highly brittle in structure form. By embedding a continuous wire within a layer, we can enhance the mechanical properties of that layer.

For the preceding reasons, there is a need for a zeolite structure with an embedded heating element to decrease system size, power consumption, and temperature ramp-up time, and enhance its mechanical properties, and for that embedded heating element to have accessible connection points at either end of the wire to connect it to a power source for electrification.

SUMMARY

In one implementation, an adsorbent structure is characterized as having a height h that is formed from n arrays of a layer of zeolite having embedded wire therein and having bare wire leads and $W_g$ zeolite layers, wherein h is a positive number, n is a natural number, and $W_g$ is a whole number.

In one implementation, the adsorbent structure is further characterized as each layer of zeolite having embedded wire therein comprises a first perimeter road and a first infill road within the first perimeter road and each zeolite layer comprises a second perimeter road and a second perimeter.

In one implementation, the adsorbent structure is further characterized wherein the embedded wire is embedded in at least one of the first perimeter road, the first infill road, and both the first perimeter road and first infill road.

In one implementation, an adsorbent structure is characterized by a process comprising the steps of: beginning a first extrusion of a length of bare wire to create a first wire lead; followed by a co-extrusion of the wire and a zeolite to create a wire-embedded structure layer, and finishing with a second extrusion of a length of bare wire to create a second wire lead.

In one implementation, the adsorbent structure is further formed from a continuous wire and zeolite, comprising: at least a first layer having a perimeter wall and roads within the perimeter wall formed from a first extrusion of a first length of bare wire to create a first wire lead, a first co-extrusion of the wire and the zeolite; and a second extrusion of a second length of bare wire to create a second wire lead.

In one implementation, the adsorbent structure is further characterized by having a second layer having a perimeter wall and roads within the perimeter wall formed from an extrusion of the zeolite only, and wherein the second layer is adjacent the first layer.

In one implementation, the adsorbent structure is further characterized by having a third layer having a perimeter wall and roads within the perimeter wall formed from a third extrusion of a third length of bare wire to create a third wire lead, a second co-extrusion of the wire and the zeolite, and a fourth extrusion of a four length of bare wire to create a fourth wire lead, and wherein the third layer is adjacent the second layer.

In one implementation, the adsorbent structure is further characterized by having a fourth layer having a perimeter wall and roads within the perimeter wall formed from an second extrusion of the zeolite only, and wherein the fourth layer is adjacent the third layer.

In one implementation, the adsorbent structure is further characterized by having the first wire lead, the second wire lead, the third wire lead, and fourth wire lead run parallel.

In one implementation, the adsorbent structure is further characterized by having the first wire lead and second wire lead run parallel to each other, the third wire lead and the fourth wire lead run parallel to each other, and the first wire lead and second wire lead run orthogonal to the third wire lead and the fourth wire lead.

In one implementation, an adsorbent structure is characterized from a continuous wire and zeolite, where at least one wire-embedded-zeolite layer having a perimeter wall and roads within the perimeter wall formed from a first extrusion of a first length of bare wire to create a first wire lead, a first co-extrusion of the wire and the zeolite; and a second extrusion of a second length of bare wire to create a second wire lead.

In one implementation, the adsorbent structure is further characterized by having at least one zeolite layer having a perimeter wall and roads within the perimeter wall formed from an extrusion of the zeolite only.

In one implementation, the adsorbent structure is further characterized by having at least one wire-embedded-zeolite layer and the at least one zeolite layer alternate one layer on top of the other layer to form a multi-layered absorbent structure.

In one implementation, the adsorbent structure is formed from a continuous wire and zeolite that is characterized by a wire-embedded-zeolite layer having a perimeter wall and roads within the perimeter wall formed from a first extrusion of a first length of bare wire to create a first wire lead, a first co-extrusion of the wire and the zeolite; and a second extrusion of a second length of bare wire to create a second wire lead and at least one layer of zeolite wherein each layer having a perimeter wall and roads within the perimeter wall formed from an extrusion of the zeolite only.

In one implementation, the adsorbent structure array is formed from a continuous wire and zeolite that is characterized by each array having a wire-embedded-zeolite layer having a perimeter wall and roads within the perimeter wall formed from a first extrusion of a first length of bare wire to create a first wire lead, a first co-extrusion of the wire and the zeolite; and a second extrusion of a second length of bare wire to create a second wire lead and at least one layer of zeolite wherein each layer having a perimeter wall and roads within the perimeter wall formed from an extrusion of the zeolite only.

BRIEF DESCRIPTION OF THE DRAWINGS

These and other features, aspects, and advantages of the disclosure will become better understood given the following description, appended claims, and accompanying drawings where:

FIG. 5 shows an implantation where the bare wire leads are attached to an adjustable power supply for electrification.

DESCRIPTION

In the Summary above and the Description, and the claims below, and in the accompany drawings, reference is made to particular features (including method steps) of the implementations with the disclosure. It is to be understood that the disclosure of the implementations in this description include all possible combinations of such particular features. For example, where a particular aspect or embodiment of the implementation, or a particular claim, that feature can also be used, to the extent possible, in combination with and/or in the context of the other particular aspects and implementations of the disclosure, and in the disclosure generally.

Figure 1A:
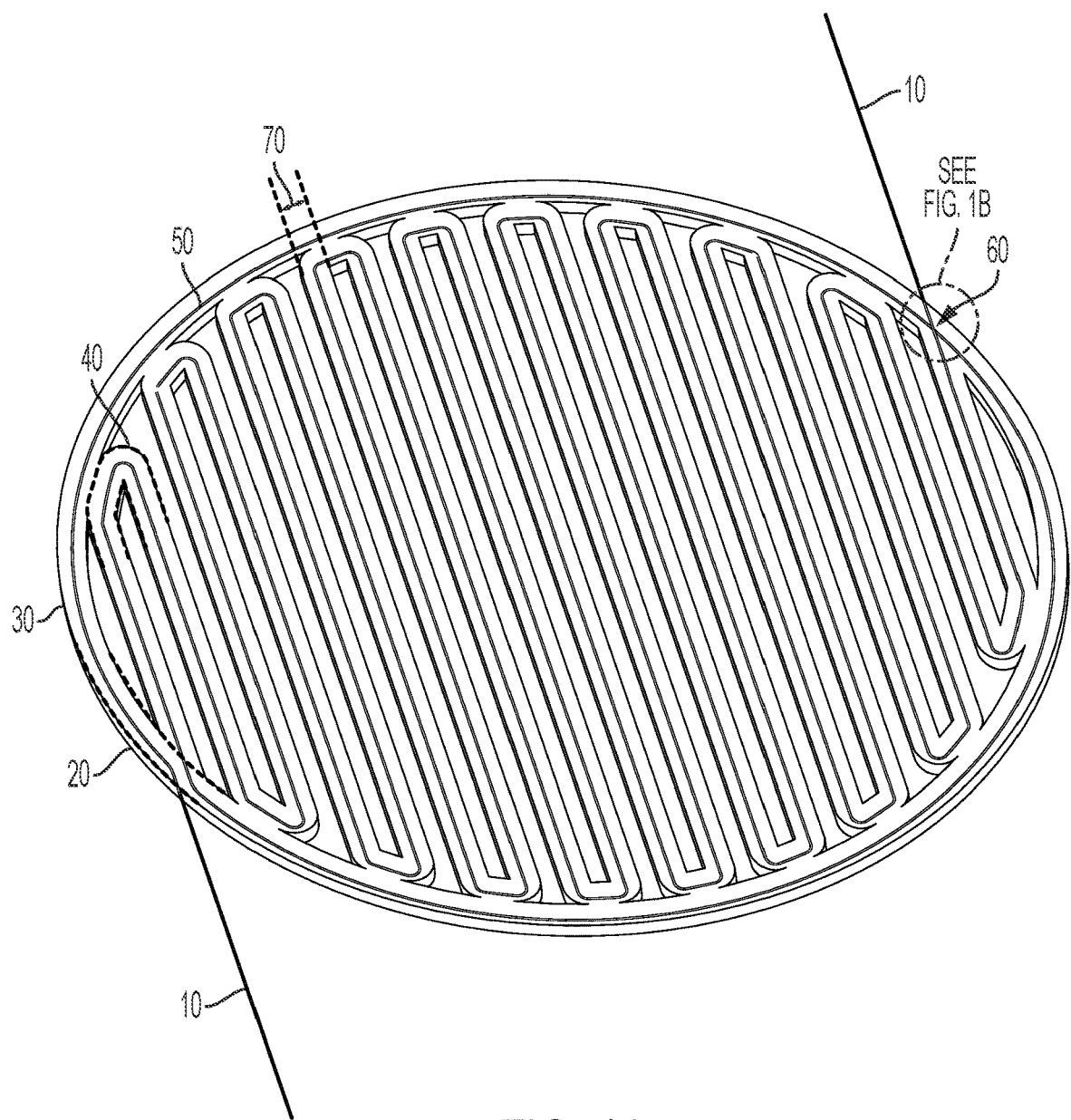
FIG. 1A shows an isometric view of a single layer of a zeolite structure with a continuous wire running throughout the entire layer (i.e., through the perimeter wall and the infill).
Figure 1B:
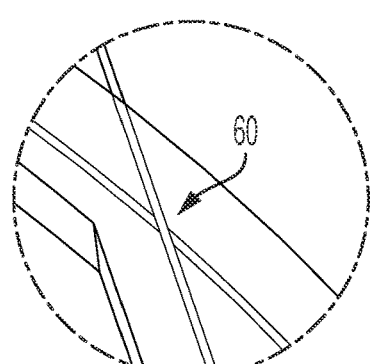
FIG. 1B shows a close up view of where the embedded wire in the infill section of the layer overlaps the embedded wire in the perimeter section; in these instances, the overlapping wire is raised during embedment to prevent shorting between sections.

FIG. 1A depicts a single layer 30 of a multi-layer zeolite structure with bare wire leads 10 protruding. This layer 30 consists of a continuous wire 50 embedded in a zeolite paste in both the perimeter wall 20 and infill 40 fabricated in a 3D printing process. The wire 50 is nominally centered in each zeolite road 70 to prevent inter-layer shorting with any preceding or subsequent wire-embedded layer. However, in cases where the wire 50 must cross itself within the same layer 60, the wire 50 is locally laid slightly elevated to prevent intra-layer shorting while still wholly encapsulated in the zeolite road 70. See FIG. 1B The distance elevated is dependent on the dielectric breakdown strength of the specific encapsulating material. In these crossing sections 60, the bare wire lead 10 is laid after and crosses the perimeter wall section 20.

Figure 2:
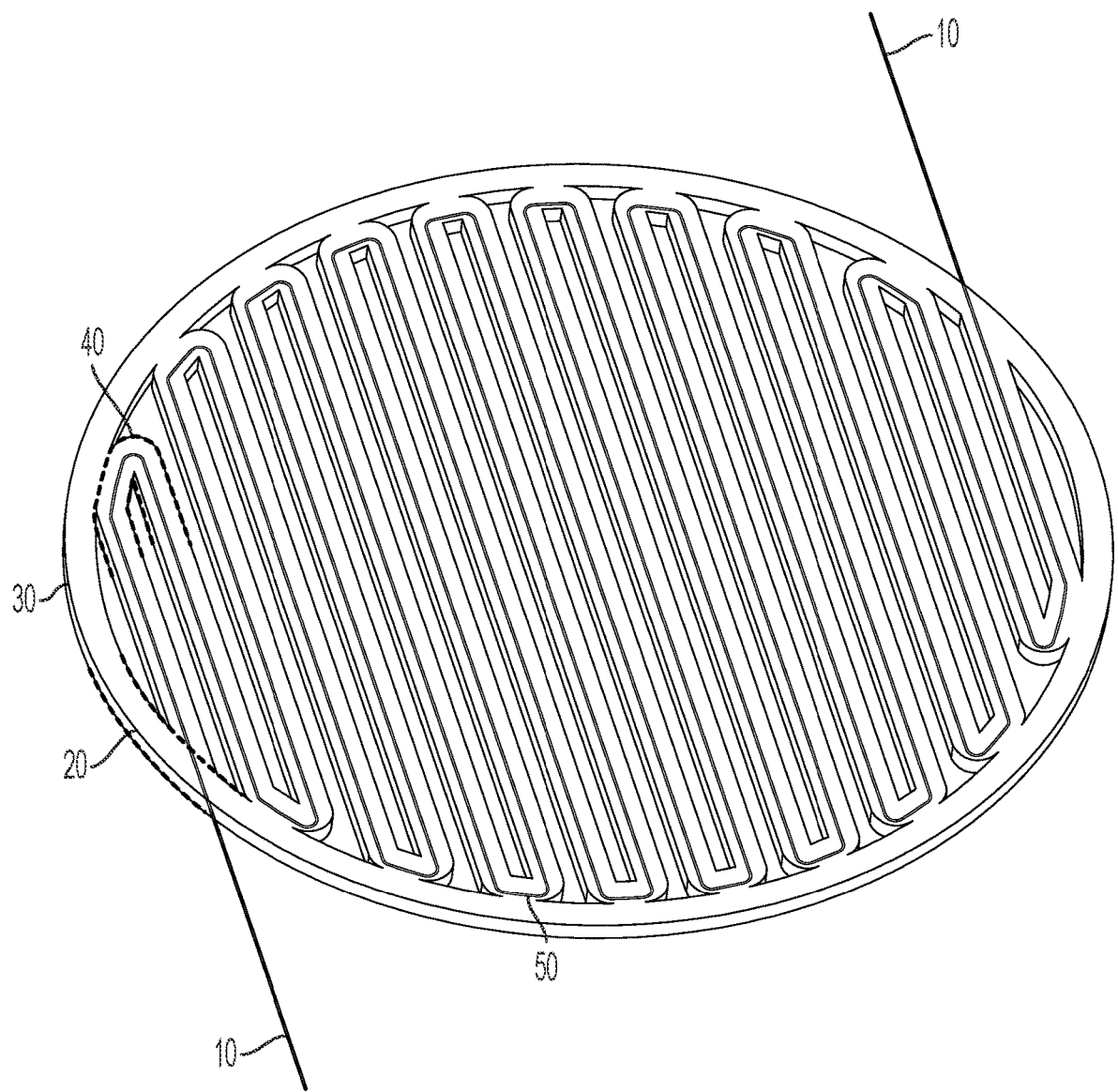
FIG. 2 shows an isometric view of a single layer of a zeolite structure with a continuous wire running through just the infill.

FIG. 2 depicts a single layer 30 of a multi-layer zeolite structure with bare wire leads 10 protruding. This layer 30 consists of a continuous wire 50 embedded in a zeolite paste in only the infill section 40. The wire leads 10 are laid after and crosses the pure-zeolite perimeter wall 20.

Figure 3:
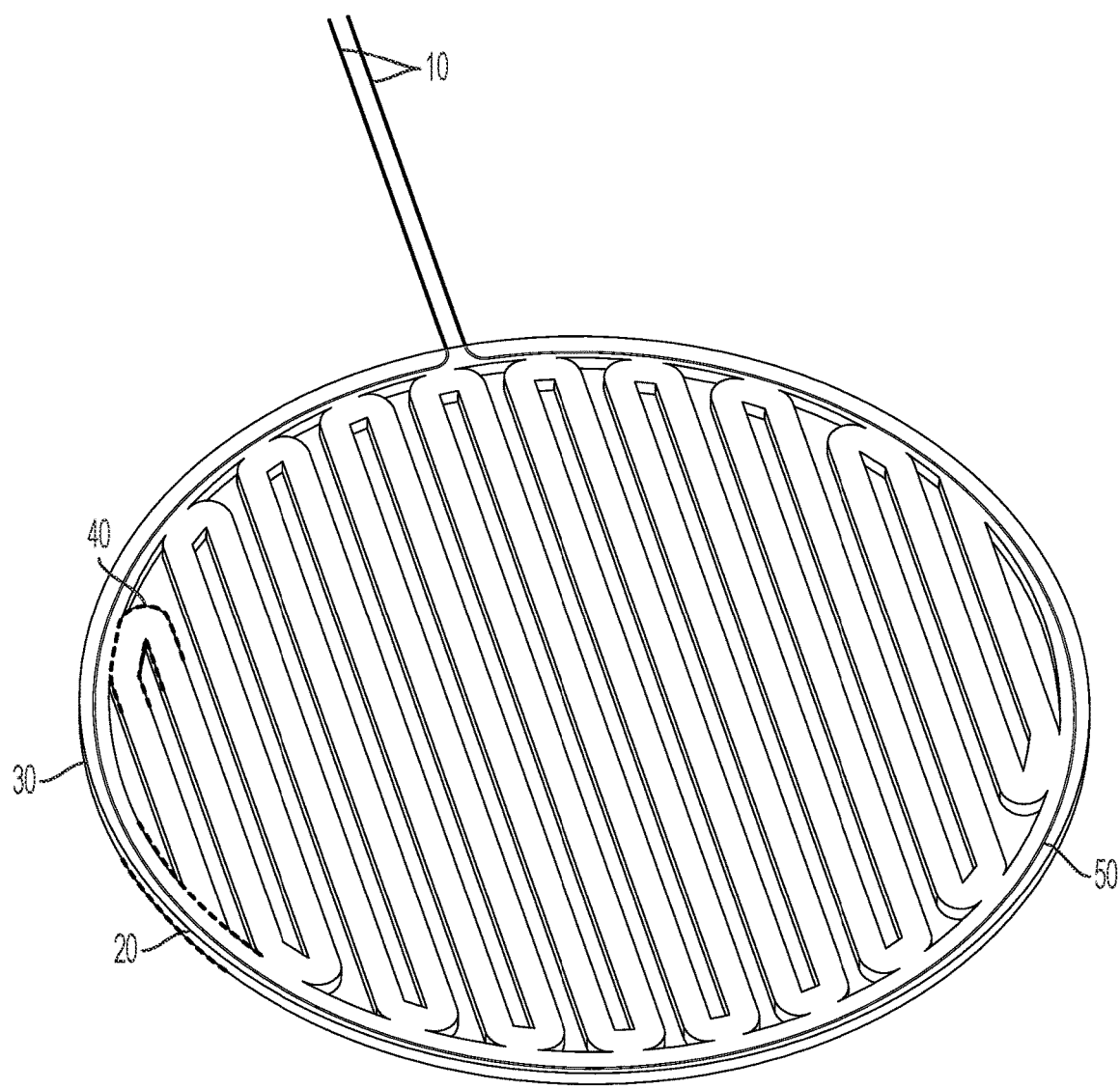
FIG. 3 shows an isometric view of a single layer of a zeolite structure with a continuous wire running through just the perimeter wall.

FIG. 3 depicts a single layer 30 of a multi-layer zeolite structure with bare wire leads 10 protruding. This layer 30 consists of a continuous wire 50 embedded in a zeolite paste in only the perimeter wall section 20.

FIG. 1-3 show different implementations for the disclosure. It is understood that further implementations may not be shown, such as a wire only running in every other road 70 of the infill section 40. Each implementation depends on the application, its required thermal and structural properties, its desired system footprint, and the expected fluid flow rate through the system. For example, it may be desirable for a specific application to alternate between layers of wire-embedded infill 40 (FIG. 2) and wire-embedded perimeter walls 20 (FIG. 3). Depending on the application, a specific implementation of this disclosure can be designed and fabricated.

Figure 4:
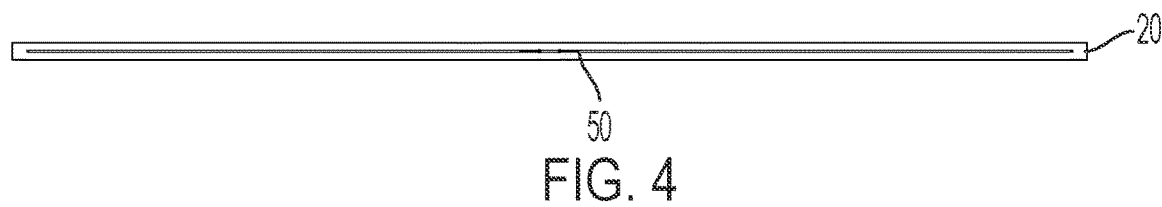
FIG. 4 shows a side view of a single layer of a zeolite structure with a continuous wire running throughout the entire layer, showing the wire embedded in the center of the layer.

FIG. 4 shows the side view of FIG. 1, showing the nominally centered wire 50 in each zeolite road 70 to prevent inter-layer shorting with any preceding or subsequent wire-embedded layer.

Figure 5:
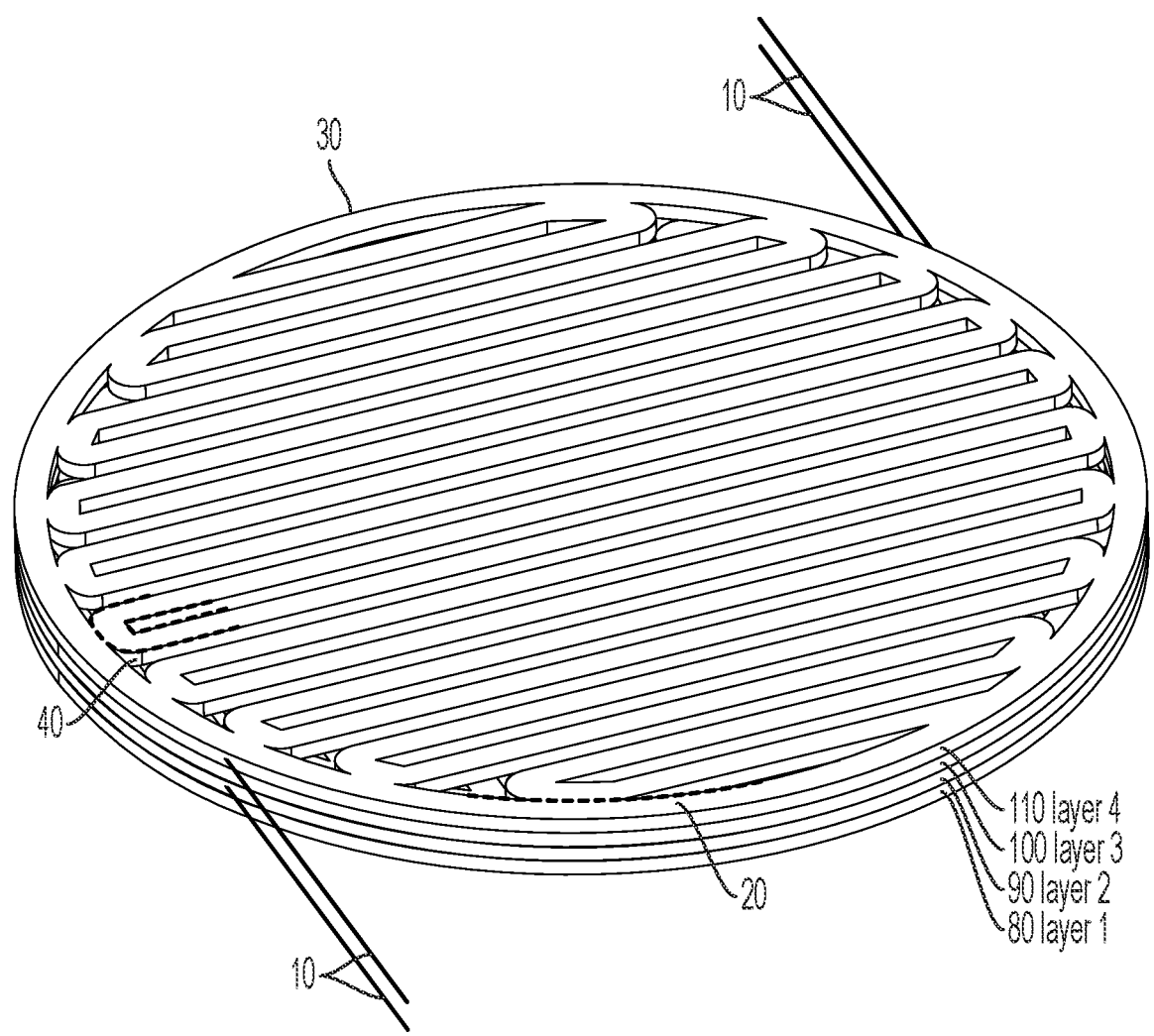
FIG. 5 is an isometric view of a four-layer zeolite structure with continuous wires running through two separate layers, spaced by one layer of a zeolite-only layer. Additionally.
Figure 6:
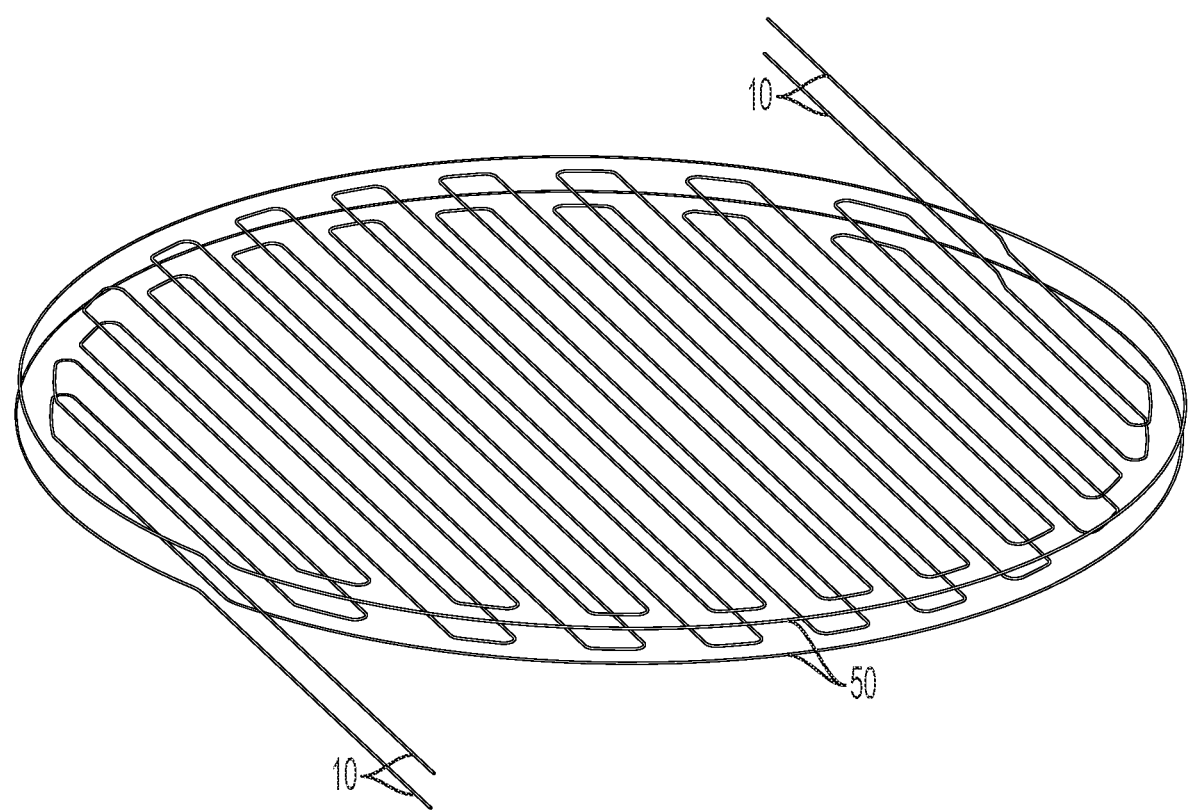
FIG. 6 is an isometric view of the four-layer zeolite structure from FIG. 5 with the zeolite hidden, showing the path of the two heating elements embedded one layer apart.

FIG. 5 shows a four-layer structure with two wire-embedded layers (layers 1 80 and 3 100). FIG. 6 shows the same structure with the zeolite roads hidden to exhibit the embedded heating elements 50. The specific spacing (e.g., every layer, every third layer, etc.), orientation, and style of the heating elements 50 can be altered based on the specific application and its specific requirements.

Figure 8:
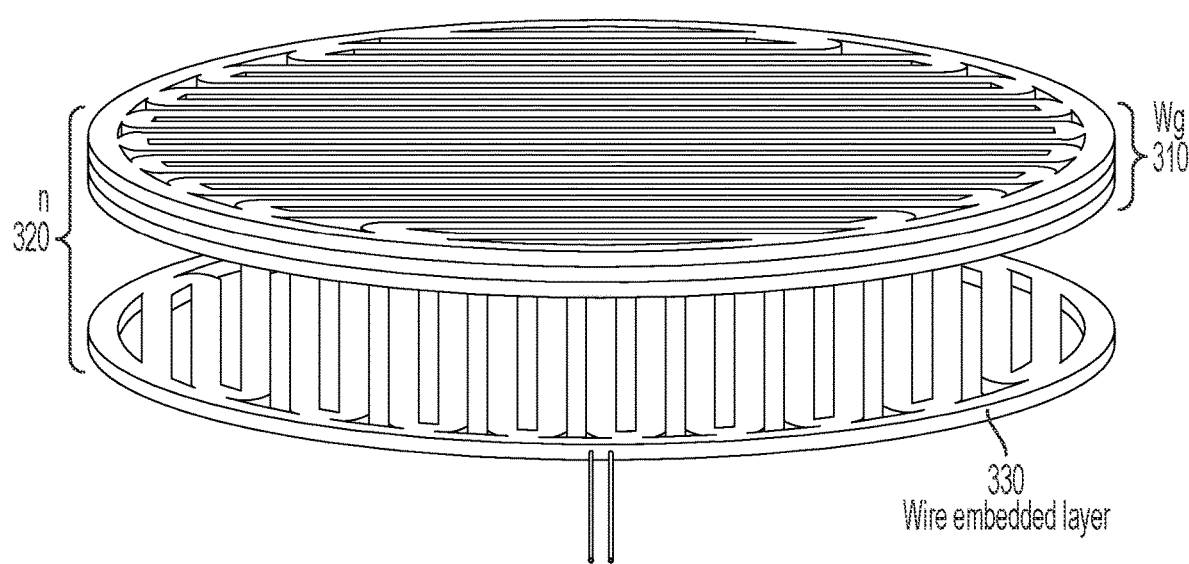
FIG. 8 shows an exploded view of the section array of wire-embedded and non-wire embedded zeolite layers. The array starts with a wire-embedded layer and is concluded with a section of non-wire-embedded layer(s). This array is repeated until the desired structure height is fabricated. Depending on the design, the wire-embedded layer may be followed with 1, 2, 3, etc. layers of non-wire embedded layers.

FIG. 8 expands on the aforementioned concept of wire embedment spacing. Here, n represents an array 320 consisting of a wire embedded layer 330 succeeded by layer(s) of non-wire embedded zeolite layers; these layer(s) are represented by $W_g$ 310 wherein $W_g$ 310 may consist of one of more layers. This array n 320 is repeated to fabricate a structure of desired height h.

The exact number of layers in $W_g$ 310 depends on the structure's application. For example, the International Space Station's (ISS) Carbon Dioxide Removal Assembly (CDRA) has two adsorbent beds in parallel, allowing one bed to be desorbed while the other bed is adsorbing. In this application, the desorption cycle can be substantially longer than an application where only one adsorbent bed is in use, as one bed is always adsorbing. Conversely, a miniature submarine such as the Advanced SEAL Delivery System (ASDS) is more space limited and may be limited to fitting a single adsorption bed in its air purification system. With only a single adsorption bed, the desorption time must be substantially shorter than an application with dual beds, as $CO_2$ could build up in the vehicle when the bed is blocked off for desorption. In these examples, the CDRA might use a $W_g$ 310 of 10+ layers to save weight as that is the gating factor for that application, while the ASDS may use a $W_g$ 310 of 1 layer to minimize desorption ramp up time.

Figure 9A:
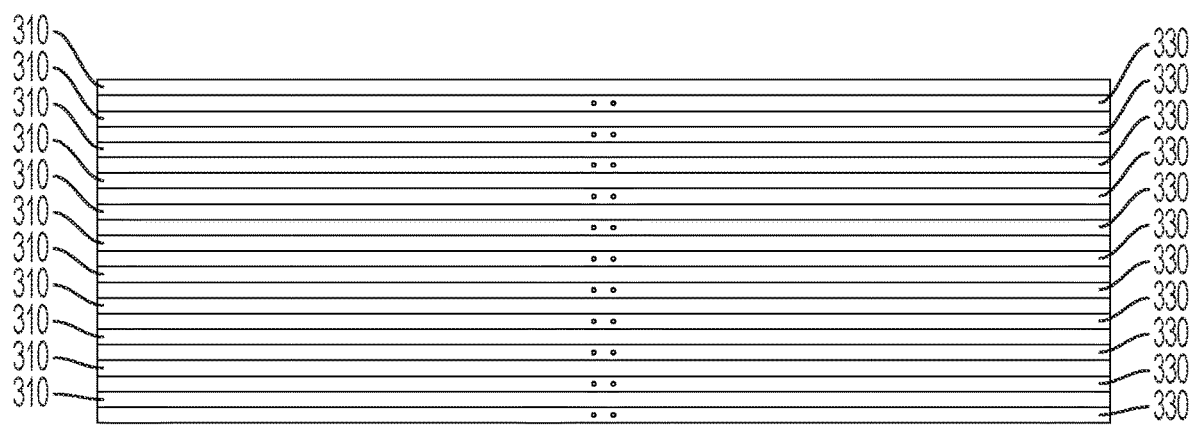
FIG. 9A shows the concept shown in FIG. 8 used in a full structure, where the section of non-wire-embedded layer(s) separating the wire-embedded layers is one layer tall.
Figure 9B:
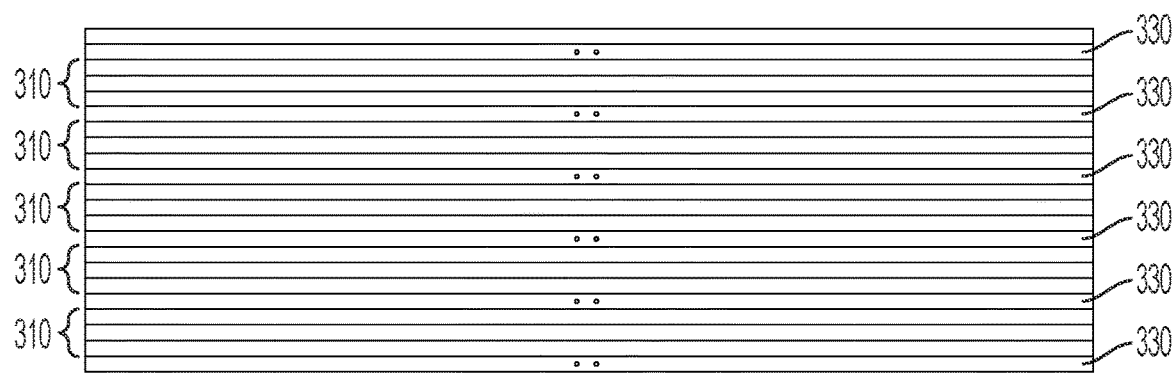
FIG. 9B shows the concept shown in FIG. 8 used in a full structure, where the section of non-wire-embedded layer(s) separating the wire-embedded layers is three layers tall.
Figure 9C:
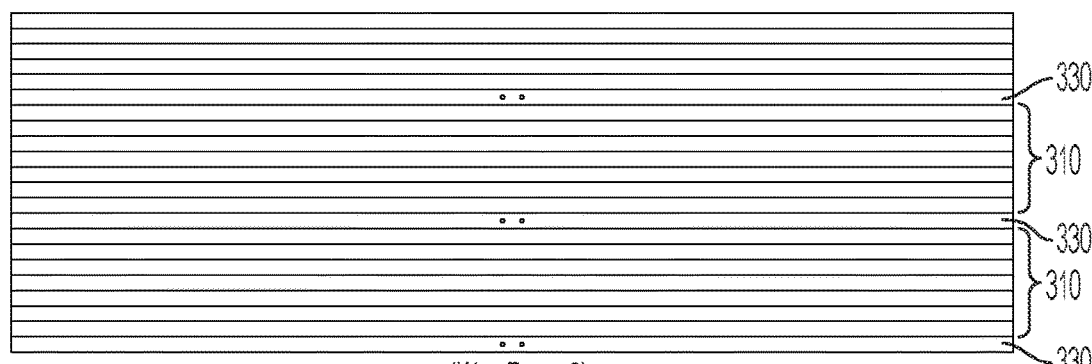
FIG. 9C shows the concept shown in FIG. 8 used in a full structure, where the section of non-wire-embedded layer(s) separating the wire-embedded layers is seven layers tall.

FIGS. 9A, 9B, and 9C show structures with wire spacing sections $W_g$ 310 consisting of 1 layer, 3 layers, and 7 layers, respectively. Meaning, in FIG. 9B for example, a wire is embedded on layers 1, 5, 9, 13, etc., with non-wire-embedded layer sections $W_g$ 310 being layers 2-4, 6-8, 10-12, etc., and, consequently, the repeating array of wire-embedded and non-wire-embedded layers n 320 being layers 1-4, 5-8, 9-12, etc. These figures are depicting three examples of $W_g$ 310, though it is understood that $W_g$ 310 could be any integer greater than or equal to 0 ($W_g$ 310 equally 0 would mean that a wire is embedded on every layer). Additionally, these figures depict structures that are all 22 layers tall, though it is understood that the total layers used to fabricate a structure can be any integer greater than or equal to 1, depending on the desired structure height and layer height utilized during fabrication.

The wire leads 10 are bare wire sections of the continuous embedded wire, extruded before and after co-extruding the wire and zeolite paste to fabricate the wire-embedded layers 90, 110. Meaning, the process to fabricate a single wire-embedded layer begins with the extrusion of a length of bare wire to create the wire lead 10, before moving to co-extruding wire and zeolite paste to create the wire-embedded structure layer 90, 110, and finally finishing with the extrusion of a length of bare wire to create the second wire lead 10.

Embedded heating element wires 50 are continuous within a single layer, allowing layers without a wire 80, 100 to be between wire-embedded layers 90, 110. Individual layers' heating elements 50 are connected post-fabrication by the wire leads 10 protruding from each wire embedded layer 90, 110. Wire leads 10 are a bare, continuous extension of the same wire forming the heating element 50, with the length of lead 10 adjustable based on the connection method to the power source for electrifying the heating element 50.

The connection method of the power source to the heating element 50 and type of power source may vary based on application. For example a single, shared power source is to be used for the entire structure. In that case, the individual wire leads 10 may be connected through the use of a busbar or terminal block (not shown), or may be individually attached to the power source. One busbar can be attached to the positive terminal of the power supply with one connection wire, while the opposite busbar is attached to the negative terminal of the power supply with the other connection wire. This configuration allows direct current (DC) power to be applied through the embedded wires 50, heating the structure uniformly.

In all cases, special care must be taken to ensure a consistent resistance is achieved across all heating elements 50. If the same style (perimeter only, infill only, etc.) of wire embedding is used throughout the structure, this can be achieved by trimming the wire leads 10 to ensure all wire lengths are the same in each wire-embedded layer 90, 110. If the styles are altered throughout the structure, the wire gauge or material may need to be altered per wire-embedded layer 90, 110 to ensure a consistent resistance. Should the resistances be left unbalanced, uneven heating of the structure may occur without an active electrical control system.

Figure 7:
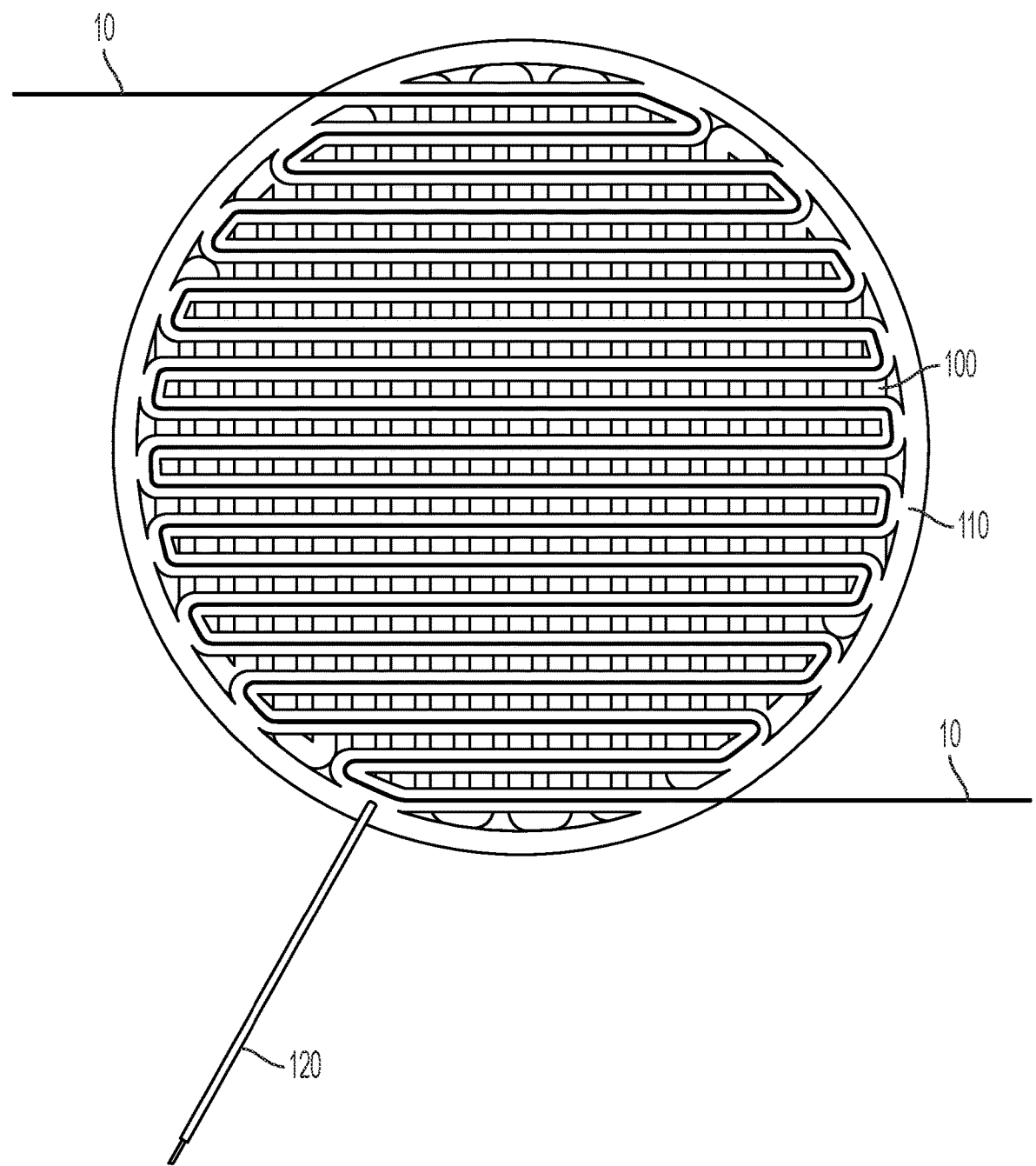
FIG. 7 shows a top view of a two-layer zeolite structure where one layer has a wire embedded. In the layer below the wire-embedded layer, a thermocouple is embedded to measure the temperature of the structure.

To compensate for uneven resistances, or to validate expected heating temperatures, a thermal monitoring device (e.g., thermocouple) 120 can be embedded into or attached to the structure to monitor the structure's temperature. See FIG. 7. The location and type of thermocouple/thermistor 120 can vary based on application, however the device 120 shall not directly touch the embedded wire 50 to prevent shorting. If a separate power source is to be used for each wire-embedded layer 90, 110, an independent thermal monitoring device 120 can be used per wire-embedded layer 90, 110. With independent power sources and separate thermal monitoring devices 120, the resistances need not be balanced.

In either implementation of a shared or separate power source for electrifying each wire-embedded layer 90, 110 with a thermal monitor device 120, a standard control scheme such as a tuned proportional-integral-derivative (PID) controller may be used for varying the current input into the heating element 50 based on the thermal monitoring device's 120 readout. This will allow for accurate and precise heating for reduced power consumption and temperature ramp-up time during desorption.

Once the structure is fabricated from the zeolite-based paste with embedded wires, the zeolite can be sintered either in a traditional sintering oven or by electrifying the embedded heating elements 50. In both cases, an optimized temperature ramp rate is critical to reducing cracking within the structure. Additionally, depending on the zeolite paste composition, it may be necessary to electrify the heating elements 50 prior to sintering until the desorption temperature is reached. This will reduce the stress due to the thermal expansion of the wire 50 against the encapsulating sintered zeolite structure.

Post-sintering, the structure is ready for use. A standard zeolite activation procedure may be used to initially desorb the structure, thermally driven either by a traditional oven or by the embedded heating elements 50.

What is claimed is:

1. An adsorbent structure prepared by a process comprising the steps of: beginning a first extrusion of a length of bare wire to create a first wire lead; followed by a co-extrusion of the wire and a zeolite to create a wire-embedded structure layer, and finishing with a second extrusion of a length of bare wire to create a second wire lead.

2. An adsorbent structure formed from a continuous wire and zeolite, comprising:
    at least a first layer having a perimeter wall and roads within the perimeter wall formed from a first extrusion of a first length of bare wire to create a first wire lead, a first co-extrusion of the wire and the zeolite; and a second extrusion of a second length of bare wire to create a second wire lead.

3. The adsorbent structure of claim 2, further comprising:
    a second layer having a perimeter wall and roads within the perimeter wall formed from an extrusion of the zeolite only, and
    wherein the second layer is adjacent the first layer.

4. The adsorbent structure of claim 3, further comprising:
    a third layer having a perimeter wall and roads within the perimeter wall formed from a third extrusion of a third length of bare wire to create a third wire lead, a second co-extrusion of the wire and the zeolite, and a fourth extrusion of a four length of bare wire to create a fourth wire lead, and
    wherein the third layer is adjacent the second layer.

5. The adsorbent structure of claim 4, further comprising:
    a fourth layer having a perimeter wall and roads within the perimeter wall formed from an second extrusion of the zeolite only, and
    wherein the fourth layer is adjacent the third layer.

6. The adsorbent structure of claim 5, wherein the first wire lead, the second wire lead, the third wire lead, and fourth wire lead run parallel.

7. The adsorbent structure of claim 6, wherein the first wire lead and second wire lead run parallel to each other, the third wire lead and the fourth wire lead run parallel to each other, and the first wire lead and second wire lead run orthogonal to the third wire lead and the fourth wire lead.

8. An adsorbent structure formed from a continuous wire and zeolite, comprising:
    at least one wire-embedded-zeolite layer having a perimeter wall and roads within the perimeter wall formed from a first extrusion of a first length of bare wire to create a first wire lead, a first co-extrusion of the wire and the zeolite; and a second extrusion of a second length of bare wire to create a second wire lead.

9. The adsorbent structure of claim 8, further comprising:
    at least one zeolite layer having a perimeter wall and roads within the perimeter wall formed from an extrusion of the zeolite only.

10. The adsorbent structure of claim 9, wherein the at least one wire-embedded-zeolite layer and the at least one zeolite layer alternate one layer on top of the other layer to form a multi-layered absorbent structure.

11. An adsorbent structure array formed from a continuous wire and zeolite, comprising:
    a wire-embedded-zeolite layer having a perimeter wall and roads within the perimeter wall formed from a first extrusion of a first length of bare wire to create a first wire lead, a first co-extrusion of the wire and the zeolite; and a second extrusion of a second length of bare wire to create a second wire lead and
    at least one layer of zeolite wherein each layer having a perimeter wall and roads within the perimeter wall formed from an extrusion of the zeolite only.

12. At least one adsorbent structure array formed from a continuous wire and zeolite, each array comprises:
    a wire-embedded-zeolite layer having a perimeter wall and roads within the perimeter wall formed from a first extrusion of a first length of bare wire to create a first wire lead, a first co-extrusion of the wire and the zeolite; and a second extrusion of a second length of bare wire to create a second wire lead and
    at least one layer of zeolite wherein each layer having a perimeter wall and roads within the perimeter wall formed from an extrusion of the zeolite only.

* * * * *